United States Patent
Jiang et al.

(10) Patent No.: US 11,734,319 B2
(45) Date of Patent: Aug. 22, 2023

(54) QUESTION ANSWERING METHOD AND APPARATUS

(71) Applicant: Huawei Technologies Co., Ltd., Shenzhen (CN)

(72) Inventors: Xin Jiang, Hong Kong (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 993 days.

(21) Appl. No.: 16/544,267

(22) Filed: Aug. 19, 2019

(65) Prior Publication Data

US 2019/0371299 A1 Dec. 5, 2019

Related U.S. Application Data

(63) Continuation of application No. PCT/CN2018/077486, filed on Feb. 28, 2018.

(30) Foreign Application Priority Data

Feb. 28, 2017 (CN) .......................... 201710115633.0

(51) Int. Cl.
*G06F 16/332* (2019.01)
*G10L 15/06* (2013.01)
(Continued)

(52) U.S. Cl.
CPC ........ *G06F 16/3329* (2019.01); *G10L 15/063* (2013.01); *G10L 15/197* (2013.01);
(Continued)

(58) Field of Classification Search
CPC ............. G06F 16/3329; G06F 16/3344; G06F 16/334; G10L 15/1822; G10L 15/22
See application file for complete search history.

(56) References Cited

U.S. PATENT DOCUMENTS

| 10,755,177 B1 * | 8/2020 | Dabney .................. G06N 5/041 |
| 2010/0191686 A1 * | 7/2010 | Wang ..................... G06F 16/33 |
| | | 707/E17.014 |

(Continued)

FOREIGN PATENT DOCUMENTS

| CN | 103049433 A | 4/2013 |
| CN | 103229120 A | 7/2013 |

(Continued)

OTHER PUBLICATIONS

Machine Translation and Abstract of Chinese Publication No. CN104679910, Jun. 3, 2015, 12 pages.

(Continued)

*Primary Examiner* — Mark Villena
(74) *Attorney, Agent, or Firm* — Conley Rose, P.C.

(57) ABSTRACT

A question answering method includes obtaining target question information; determining a candidate question and answer pair based on the target question information; calculating a confidence of answer information in the candidate question and answer pair, where the confidence is used to indicate a probability that question information in the candidate question and answer pair belongs to an answer database or an adversarial database; determining whether the confidence is less than a first preset threshold; and when the confidence is less than the first preset threshold, outputting information indicating incapable of answering.

20 Claims, 6 Drawing Sheets

(51) Int. Cl.
*G10L 15/197* (2013.01)
*G10L 15/22* (2006.01)

(52) U.S. Cl.
CPC ...... *G10L 15/22* (2013.01); *G10L 2015/0636* (2013.01); *G10L 2015/225* (2013.01)

(56) References Cited

U.S. PATENT DOCUMENTS

| | | | |
|---|---|---|---|
| 2012/0078889 A1 | 3/2012 | Chu-Carroll et al. | |
| 2012/0078891 A1 | 3/2012 | Brown et al. | |
| 2013/0266925 A1* | 10/2013 | Nunamaker, Jr. | G09B 7/00 434/362 |
| 2013/0304730 A1* | 11/2013 | Zhou | G06Q 30/02 707/723 |
| 2014/0006012 A1 | 1/2014 | Zhou et al. | |
| 2015/0026169 A1* | 1/2015 | Brown | G06F 16/24578 707/723 |
| 2016/0098441 A1 | 4/2016 | Waltinger | |
| 2016/0117314 A1* | 4/2016 | Kantor | G06F 40/205 704/9 |
| 2017/0004204 A1* | 1/2017 | Bastide | G06F 16/3329 |
| 2017/0024645 A1 | 1/2017 | Socher et al. | |
| 2017/0199928 A1 | 7/2017 | Zhao et al. | |
| 2017/0293679 A1* | 10/2017 | Boguraev | G06F 16/3344 |
| 2017/0364805 A1* | 12/2017 | Boyer | G06N 5/04 |
| 2017/0364806 A1* | 12/2017 | Boyer | G06F 16/3329 |

FOREIGN PATENT DOCUMENTS

| | | |
|---|---|---|
| CN | 104657346 A | 5/2015 |
| CN | 104679910 A | 6/2015 |
| CN | 105144205 A | 12/2015 |
| CN | 105528349 A | 4/2016 |
| CN | 105591882 A | 5/2016 |
| CN | 106127702 A | 11/2016 |

OTHER PUBLICATIONS

Machine Translation and Abstract of Chinese Publication No. CN106127702, Nov. 16, 2016, 15 pages.
Machine Translation and Abstract of Chinese Publication No. CN105591882, May 18, 2016, 18 pages.
Goodfellow, I., et al., "Generative Adversarial Nets," Proceedings of the 2014 Conference on Advances in Neural Information Processing Systems 27, Dec. 31, 2014, 9 pages.
Ranzato, M. A., et al., "Sequence Level Training with Recurrent Neural Networks," ICLR 2016, May 6, 2016, 16 pages.
Williams, R. J. et al., "Simple Statistical Gradient-Following Algorithms for Connectionist Reinforcement Learning," Machine learning, 8(3-4), 1992, 28 pages.
Foreign Communication From a Counterpart Application, PCT Application No. PCT/CN2018/077486, English Translation of International Search Report dated May 18, 2018, 2 pages.
Foreign Communication From a Counterpart Application, PCT Application No. PCT/CN2018/077486, English Translation of Written Opinion dated May 18, 2018, 4 pages.
Lantao Yu et al, "SeqGAN: Sequence Generative Adversarial Nets with Policy Gradient", Proceedings of the Thirty-First AAAI Conference on Artificial Intelligence (AAAI-17), Feb. 2017, total 7 pages.
Foreign Communication From a Counterpad Application, European Application No. 18760453.3, Extended European Search Report dated Oct. 31, 2019, 12 pages.

* cited by examiner

QUESTION ANSWERING METHOD AND APPARATUS

CROSS-REFERENCE TO RELATED APPLICATIONS

This application is a continuation application of International Application No. PCT/CN2018/077486, filed on Feb. 28, 2018, which claims priority to Chinese Patent Application No. 201710115633.0, filed on Feb. 28, 2017. The disclosures of the aforementioned applications are hereby incorporated by reference in their entireties.

TECHNICAL FIELD

The present disclosure relates to the field of intelligent processing, and in particular, to a question answering method and apparatus.

BACKGROUND

An automatic question answering system (or a question answering system for short) is a system that can directly provide an answer to a question posed by a user in a natural language. Based on a question scope, the question answering system may be classified into an open domain open domain and a closed domain close domain. Literally, an open-domain question answering system does not limit the question scope, and expects to answer questions about all knowledge in the world. For example, Baidu® Knows and Yahoo!® Answers are such systems. A closed-domain system focuses on answering questions in a closed domain, such as the healthcare industry or a particular company. For example, IBM® Watson and Stack® Overflow are such systems. The question answering system is implemented using methods based on information retrieval, based on a structured knowledge base, based on a deep neural network model, or the like. Regardless of the methods, the question answering system is constructed based on a knowledge base. The knowledge base may be in various forms, such as a structured database and an unstructured text corpus. For an unstructured knowledge base, an information retrieval-based question answering system is currently a mainstream implementation. Frequently used question answering websites (such as Baidu® Knows, Yahoo!® Answers, Quora®, and Stack® Overflow) are all information retrieval-based question answering systems. Question answering accuracy is a main evaluation index of the question answering system, and is also a focus of most research and application of the question answering system at present. However, in an embodiment application, regardless of the open domain or the closed domain, a knowledge base of any question answering system is limited. Therefore, a scope of questions that can be answered by the question answering system is certainly limited. In this specification, a question that cannot be answered by the question answering system is referred to as an unknown question (unknown question).

In other approaches, an information retrieval-based question answering system is provided. The system is applied to a case in which a knowledge base is an unstructured text corpus. In a community question answering system, a knowledge base usually includes many "question-answer" pairs, and questions and answers are all in a natural language. A search engine is used to index the entire knowledge base using each "question-answer" pair as a "document" for indexing. A specific manner is provided. A question entered by a user is analyzed and processed, and then the question is used as a search word to retrieve the knowledge base, to obtain a list of candidate documents (question and answer pairs). Answers are selected or fused based on the list of candidate question and answer pairs to form a final answer, and the final answer is returned to the user.

However, in the information retrieval-based question answering system, when a question and answer pair in the knowledge base cannot be accurately matched, answer accuracy usually cannot be ensured. For example, it is assumed that the knowledge base of the question answering system includes the following three questions: Question 1: "What place was the 2008 Summer Olympic Games held in?" Answer: "Beijing". Question 2: "Which city held the 2012 Olympic Games?" Answer: "London". Question 3: "Where was the 2014 Winter Olympic Games held?" Answer: "Sochi".

When the question entered by the user is "What place was the 2016 Summer Olympic Games held in?", the search engine retrieves the question base and calculates a degree of matching between the question of the user and the question in the knowledge base; and then determines that the first question in the knowledge base matches the question of the user best, and therefore provides a corresponding answer: "Beijing". However, this answer is obviously incorrect (a correct answer is "Rio", and is not in the knowledge base). Based on a situation of the knowledge base of the question answering system, a most appropriate answer should be "incapable of answering this question", in other words, the question of the user is considered as an unknown question. This is because "incapable of answering" is a correct information feedback in this case, and is better than returning an incorrect answer to the user.

In conclusion, the information retrieval-based question answering system has no effective mechanism for identifying an unknown question. In principle, the information retrieval-based question answering system can find only a question that best matches a question of a user from the knowledge base and return a corresponding answer to the user. In this case, for a question beyond a scope of the knowledge base of the question answering system, the question answering system often provides an incorrect answer to the user, thereby misleading or even causing a loss to the user.

SUMMARY

Embodiments of the present disclosure provide a question answering method, to determine whether a question posed by a user is an unknown question, thereby improving answering accuracy.

A first aspect of the embodiments of the present disclosure provides a question answering method, including obtaining target question information entered by a user; determining a candidate question and answer pair in a knowledge base based on the target question information using a search engine; calculating a confidence of answer information in each candidate question and answer pair, where the confidence is used to indicate a probability that question information in the candidate question and answer pair belongs to an answer database or an adversarial database, the confidence is positively correlated to the probability that the question information in the candidate question and answer pair belongs to the answer database, the answer database stores a standard question and answer pair, and the adversarial database stores an adversarial question (which is also referred to as an adversarial sample) corresponding to the standard question and answer pair in the answer database;

determining whether the confidence of each piece of answer information is less than a first preset threshold; and if no, outputting the corresponding answer information, or if yes, outputting "incapable of answering".

In this way, the candidate question and answer pair is determined in the knowledge base based on a matching degree, and then the confidence of each piece of answer information is calculated. A higher confidence indicates a higher probability that corresponding question information belongs to the answer knowledge base that stores the standard question and answer pair in order to indicate that answer information has higher accuracy. Therefore, the answer information can be output. A relatively low confidence indicates a relatively high probability that corresponding question information belongs to the adversarial database such that the target question is determined as an unknown question. Therefore, "incapable of answering" can be output in order to avoid misleading the user, thereby improving answering accuracy.

In a possible implementation, the determining whether the confidence is less than a first preset threshold may be determining whether a fusion value of the confidence and a matching degree is less than the first preset threshold, where the matching degree is a degree of matching between the target question information and question information that is stored in the answer database, and the confidence and the matching degree are separately positively correlated to the fusion value.

The matching degree may also be used as a basis for determining answer accuracy. Therefore, fusion calculation may be performed with reference to the confidence of the answer information and the matching degree of the question information. For example, the fusion value may be obtained through product calculation. When a confidence of an answer is 0.8, and a matching degree of a question corresponding to the answer is 0.9, a fusion value of the confidence and the matching degree is 0.72. Then whether to output the answer information is determined based on the fusion value.

In another possible implementation, before the target question information is obtained, a virtual model generator may be further created in advance. A set of M questions is selected from the answer database using the generator, and N adversarial questions are generated through training based on the set of M questions; and the N adversarial questions are saved in the adversarial database. M and N are positive integers greater than or equal to 1, and values of M and N may be the same or may be different.

In another possible implementation, a virtual model discriminator may be further created in advance. The discriminator selects a set of K questions from the answer database and selects a set of L questions from the adversarial database. The set of K questions is used as positive samples, and the set of L questions is used as negative samples. Both K and L are positive integers greater than or equal to 1, and values of K and L may be the same or may be different.

The discriminator performs model training on the generator based on the positive samples and the negative samples, determines, using a trained discriminator model, a belonging probability of each adversarial question generated by the generator, and sends a determining result to the generator. The belonging probability is used to indicate a probability that a question belongs to the answer database or the adversarial database.

Before the question of the user is answered, a capability of answering a question of a user by a device may be further increased by performing adversarial training on the generator and the discriminator when the device is in an offline state. The adversarial training means that the generator continuously generates question information that is similar to a question in the answer knowledge base as an adversarial question, and the discriminator determines a belonging probability of the question generated by the generator, in an embodiment, the discriminator determines a probability that the question generated by the generator belongs to the answer database or the adversarial database, and then sends a determining result to the generator such that the generator generates a new adversarial question based on the determining result. Therefore, a capability of the generator is improved, and the generator can generate an adversarial question that is more similar to the question in the answer database. The discriminator continues to obtain the new adversarial question as a negative example, thereby improving a determining capability of the discriminator. Such training is repeated. Therefore, a confidence of an answer calculated by the device is improved, and further, accuracy of answering the question of the user by the device is improved.

A second aspect of the embodiments of the present disclosure provides a question answering apparatus, including an obtaining unit configured to obtain target question information; a determining unit configured to determine a candidate question and answer pair based on the target question information; a calculation unit configured to calculate a confidence of answer information in the candidate question and answer pair, where the confidence is used to indicate a probability that question information in the candidate question and answer pair belongs to an answer database or an adversarial database, the confidence is positively correlated to the probability that the question information in the candidate question and answer pair belongs to the answer database, the answer database is a database that stores a standard question and answer pair, and the adversarial database is a database that stores trained adversarial question information; a judgment unit configured to determine whether the confidence is less than a first preset threshold; and an output unit configured to, when the confidence is greater than or equal to the first preset threshold, output the corresponding answer information, or when the confidence is less than the first preset threshold, output "incapable of answering".

In a possible implementation, the judgment unit is further configured to determine whether a fusion value of the confidence and a matching degree is less than the first preset threshold, where the matching degree is a degree of matching between the target question information and question information that is stored in the answer database, and the confidence and the matching degree are separately positively correlated to the fusion value.

In another possible implementation, the answering apparatus further includes an input unit configured to, before the obtaining unit obtains the target question information, input a set of M questions in the answer database into a generator such that model training is performed on the generator, and N adversarial questions are generated based on a trained model, where the obtaining unit is further configured to obtain the N adversarial questions generated by the generator; and a storage unit configured to save the N adversarial questions in the adversarial database.

In another possible implementation, the input unit is further configured to, before the obtaining unit obtains the target question information, input a set of K questions in the answer database and a set of L questions in the adversarial database into a discriminator such that model training is performed on the discriminator using the set of K questions as positive samples and the set of L questions as negative samples; the input unit is further configured to input the adversarial questions generated by the generator into the discriminator such that the discriminator determines belonging probabilities of the adversarial questions, where the belonging probability is used to indicate a probability that a question belongs to the answer database or the adversarial database; the obtaining unit is further configured to obtain a determining result of the adversarial questions from the discriminator; the input unit is further configured to input the determining result into the generator such that model training is performed on the generator based on the adversarial questions determined by the discriminator and based on the determining result, and a new adversarial question is generated based on a trained model; the obtaining unit is further configured to obtain the new adversarial question generated by the generator; and the storage unit is further configured to save the new adversarial question in the adversarial database.

A third aspect of the embodiments of the present disclosure provides a question answering apparatus. The answering apparatus includes a processor, a memory, and a transceiver. The processor, the memory, and the transceiver are connected using a bus. The memory stores a computer instruction, and the processor executes the computer instruction to implement the following method such as obtaining target question information; determining a candidate question and answer pair based on the target question information; calculating a confidence of answer information in the candidate question and answer pair, where the confidence is used to indicate a probability that question information in the candidate question and answer pair belongs to an answer database or an adversarial database, the confidence is positively correlated to the probability that the question information in the candidate question and answer pair belongs to the answer database, the answer database is a database that stores a standard question and answer pair, and the adversarial database is a database that stores trained adversarial question information; determining whether the confidence is less than a first preset threshold; and when the confidence is less than the first preset threshold, outputting "incapable of answering".

A fourth aspect of the embodiments of the present disclosure provides a storage medium. The storage medium stores a computer instruction for implementing the question answering method according to the first aspect.

A fifth aspect of the embodiments of the present disclosure provides a computer program product. The computer program product includes a computer software instruction, and the computer software instruction may be loaded using a processor to implement a procedure of the question answering method according to any implementation of the foregoing first aspect.

DESCRIPTION OF EMBODIMENTS

Embodiments of the present disclosure provide a question answering method, to determine whether a question posed by a user is an unknown question, thereby improving answering accuracy.

The following clearly describes the technical solutions in the embodiments of the present disclosure with reference to the accompanying drawings in the embodiments of the present disclosure.

With development of deep learning technologies, a deep neural network is applied to various aspects of a question answering system, including calculation of a degree of matching between questions and a degree of matching between a question and an answer, question classification, answer generation, and the like. A frequently used deep neural network architecture includes a feed-forward neural network (or referred to as a multilayer perceptron), a recurrent neural network, a convolutional neural network, or the like.

When data is adequately trained, the deep neural network can capture various changes of a natural language, to better understand a question posed by a user and improve answering accuracy. The present disclosure mainly focuses on how to determine that a question posed by a user is an unknown question for the question answering system, and a determining process is implemented using the deep neural network.

The deep neural network is usually used for a supervised learning task. In an embodiment, a large amount of labeled data is used for model training. However, there are usually only positive samples (question that the question answering system can answer, in other words, a set of all questions in a knowledge base) but no negative samples (unknown questions that may be considered as all possible questions beyond the knowledge base) for a task of identifying an unknown question for the question answering system. To resolve this problem, an idea of adversarial training is used in the embodiments of the present disclosure, to alternately train a question generator and a question discriminator, and identify an unknown question using a finally obtained discriminator. An adversarial network has a generator (generator) that generates a specific type of data from random input, and the adversarial network has also a discriminator (discriminator) that obtains input from the generator or a set of real data. The discriminator can distinguish between input from different sources, in an embodiment, determine whether the input is from the generator or the real data. Two neural networks are alternately trained and optimized such that the generator can generate input that more conforms to real-data distribution, and the discriminator can more accurately determine a source of input.

Figure 1:
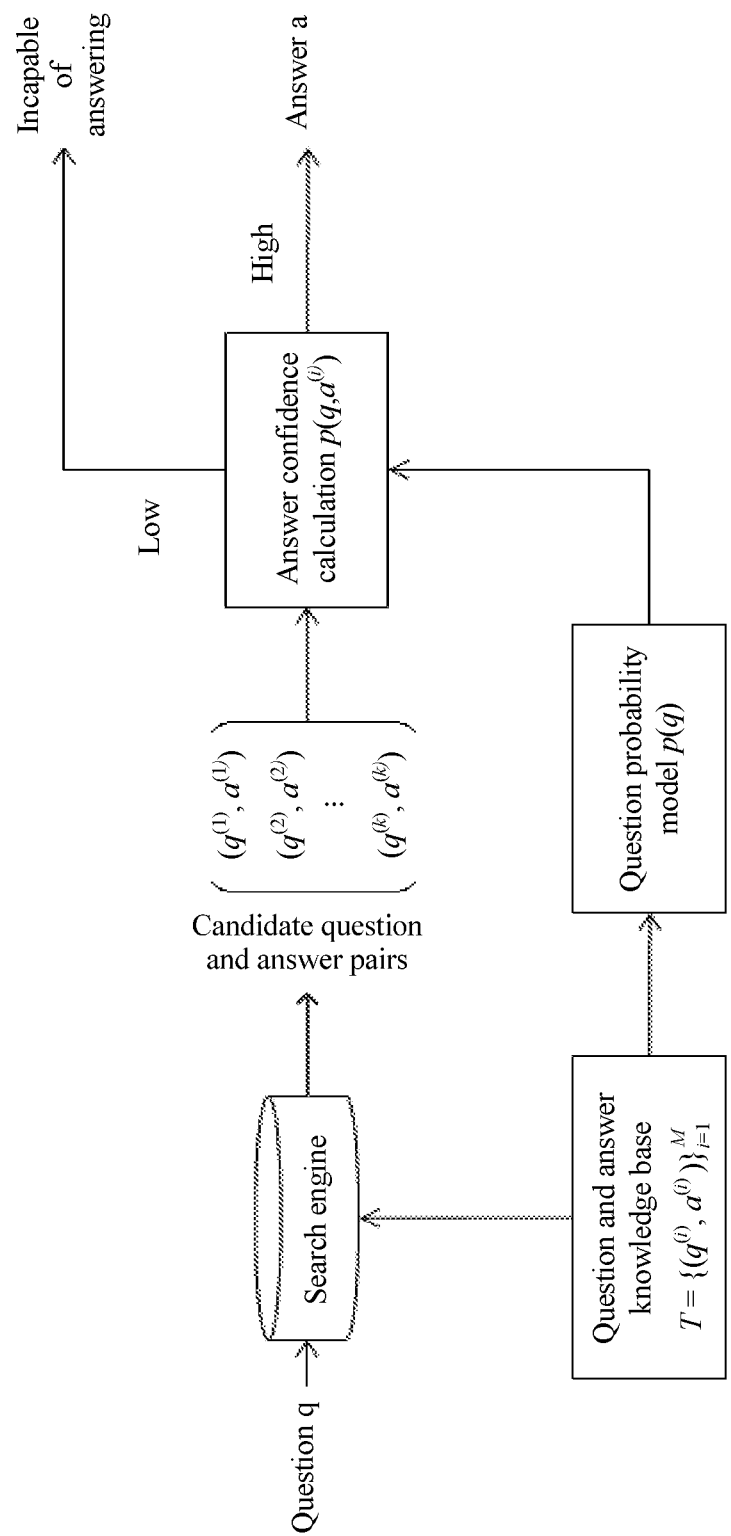
FIG. 1 is a schematic diagram of a system architecture to which a question answering method according to an embodiment of the present disclosure is applied.

Referring to FIG. 1, FIG. 1 is a schematic diagram of a system architecture to which a question answering method according to an embodiment of the present disclosure is applied.

This embodiment of the present disclosure provides a question answering system that can determine an unknown question. For a question posed by a user, the question answering system calculates a confidence of an answer with reference to information in a knowledge base and a retrieval result, and determines to provide an answer or prompt that the question answering system is incapable of answering the question. The question answering system further includes the following modules such as a question probability model training module, a search engine module, a confidence calculation module, and an answer output module.

The question probability model training module trains a probability model of a question using a set of questions in the knowledge base of the question answering system as training data. Further, adversarial training is performed. In an embodiment, a question generator and a question discriminator are alternately trained. An objective of the generator is to generate a question sample that conforms to distribution of the training data, and an objective of the discriminator is to determine whether a question is from the training data or the generator.

The search engine module searches the knowledge base of the question answering system using a search engine for the question posed by the user, to obtain a list of candidate question and answer pairs.

The confidence calculation module calculates, for each candidate question and answer pair, a confidence of the candidate question and answer pair being used as an answer to the question of the user. Further, the confidence of the candidate question and answer pair is calculated based on a probability that the question of the user is from the knowledge base and that is determined by the discriminator in the question probability model (or further with reference to a degree of matching between the question of the user and the candidate question and answer pair).

The answer output module selects a candidate answer with a highest confidence, and if the confidence is greater than a specific threshold, considers that the question can be answered and returns the answer, or if the confidence is lower than a specific threshold, considers that the question is an unknown question and returns "incapable of answering".

It should be noted that the question answering method described in this embodiment of the present disclosure may be implemented by a server, or may be implemented by a terminal, and the terminal may be an intelligent device such as a personal computer, a tablet computer, or a smartphone. Functions of the foregoing modules may be independently implemented by the server, or may be independently implemented by the terminal, or may be implemented by the server and the terminal together. The server implements functions of some modules, and the terminal implements functions of other modules. For example, the server implements functions of the question probability model training module, the search engine module, and the confidence calculation module, and the terminal implements a function of the answer output module. No specific limitation is imposed. In the following descriptions, the question answering method is implemented by the server.

Figure 2:
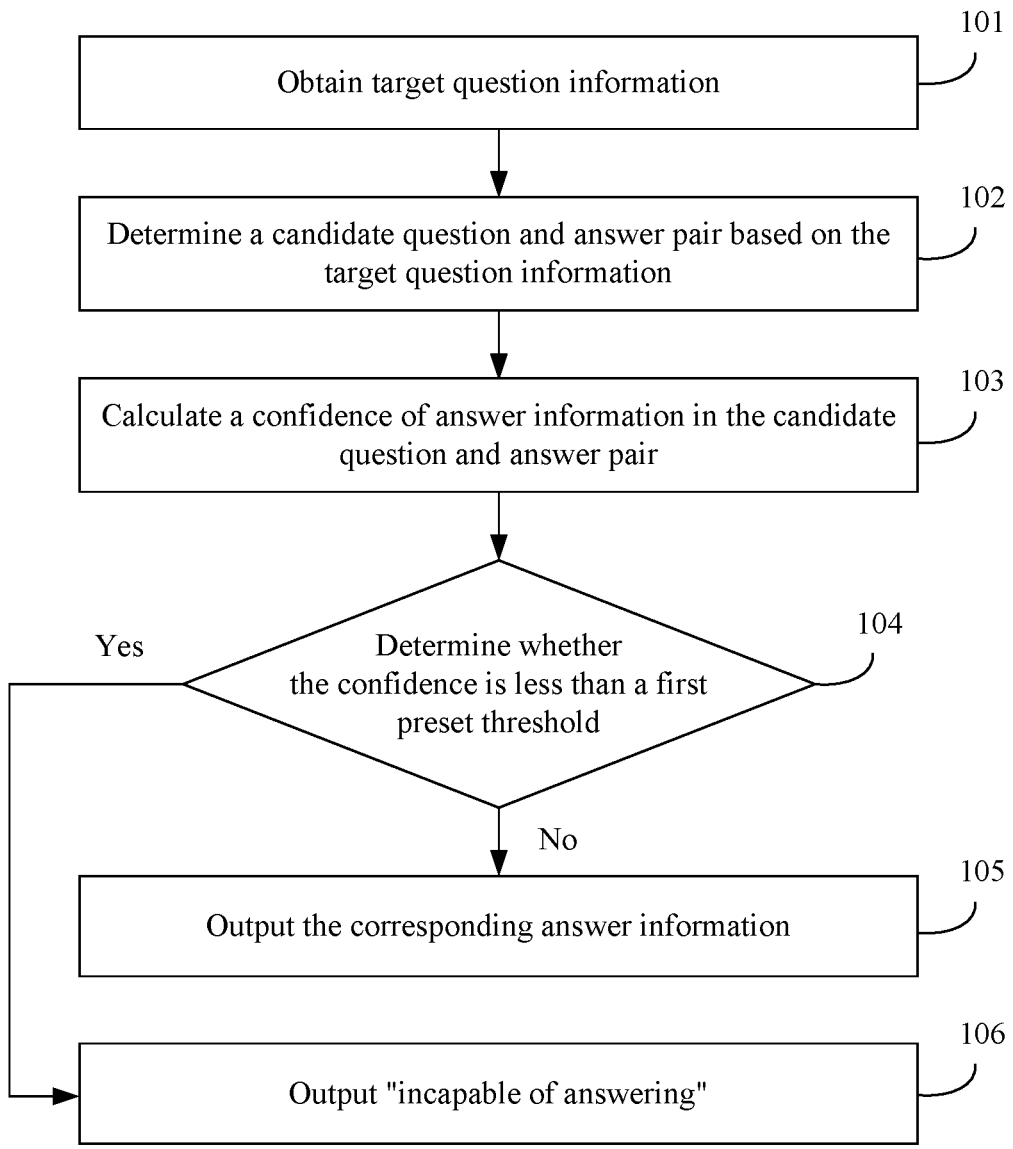
FIG. 2 is a schematic diagram of an embodiment of a question answering method according to an embodiment of the present disclosure.

Referring to FIG. 2, an embodiment of a question answering method according to an embodiment of the present disclosure includes the following steps.

101. Obtain target question information.

The target question information may be a text question entered by a user, for example, "What place was the 2008 Olympic Games held in"? The user may alternatively ask a question in speech, and after receiving speech information, a server may convert the speech into corresponding text information.

102. Determine a candidate question and answer pair based on the target question information.

After obtaining the target question information, the server searches a question and answer knowledge base using a search engine for a question that highly matches the target question information, and obtains answer information corresponding to the question with a high matching degree. If there are a plurality of questions with high matching degrees, the server obtains answer information corresponding to the plurality of questions, and uses these question and answer pairs as candidate question and answer pairs.

103. Calculate a confidence of answer information in the candidate question and answer pair, where the confidence is used to indicate a probability that question information in the candidate question and answer pair belongs to an answer database or an adversarial database, the confidence is positively correlated to the probability that the question information in the candidate question and answer pair belongs to the answer database, the answer database is a database that stores a standard question and answer pair, and the adversarial database is a database that stores a trained adversarial question corresponding to the standard question and answer pair in the answer database.

The confidence is a probability, and is used to indicate the probability that the question information corresponding to the answer information belongs to the answer database or the adversarial database. The answer database stores a standard question and answer pair, in an embodiment, an answer to each question is a correct answer. The adversarial database stores a trained adversarial question (which is also referred to as an adversarial sample), and an answer to the adversarial question is an incorrect or inaccurate answer. If there is a higher probability that the question information belongs to the answer database, it indicates that an answer corresponding to the question information is of high accuracy, and a confidence of the answer is high. If there is a higher probability that the question information belongs to the adversarial database, it indicates that an answer corresponding to the question information is of low accuracy, and a confidence of the answer is low. For example, candidate question and answer pairs include a plurality of pieces of question information with similar matching degrees. For example, question information entered by the user is "Where was the 2008 Olympic Games held?", and candidate questions include "What place was the 2008 Olympic Games held in?" and "Where was the 2016 Olympic Games held?" The two questions have close matching degrees with the question information. If a corresponding question and a corresponding answer are determined using the matching degrees only, the server may select "Where was the 2016 Olympic Games held?" as a best-matched question, and output an incorrect answer. Therefore, in this embodiment of the present disclosure, confidences of answers corresponding to the two questions are determined by calculating probabilities of the two questions. It is learned through calculation that a probability that the question "What place was the 2008 Olympics Games held in?" belongs to the answer database is 80%, and a probability that the question belongs to the adversarial database is 20%; and a probability that the question "Where was the 2016 Olympic Games held?" belongs to the answer database is 10%, and a probability that the question belongs to the adversarial database is 90%. Therefore, it is determined that a confidence of the question "What place was the 2008 Olympics Games held in?" is greater than a confidence of the question "Where was the 2016 Olympic Games held?", and probabilities that the questions belong to the answer database may be used as the confidences of the answers corresponding to the questions. In an embodiment, the confidences of the answers are respectively 0.8 and 0.1.

104. Determine whether the confidence is less than a first preset threshold, and if no, perform step 104, or if yes, perform step 106.

The first preset threshold is a threshold. If the confidence is greater than or equal to the threshold, it indicates that the confidence is relatively high. If the confidence is less than the threshold, it indicates that the confidence is relatively low. For example, the first preset threshold may be 0.7, and a specific value may be set based on a situation, or may be intelligently adjusted by the server.

Optionally, the confidence of the answer information and a matching degree of the question information may be calculated together, to determine whether an answer corresponding to the question information is a correct answer, which is further determining whether a fusion value of the confidence and the matching degree is less than the first preset threshold, where the matching degree is a degree of matching between the target question information and question information that is stored in the answer database, and the confidence and the matching degree are separately positively correlated to the fusion value.

Optionally, the fusion value may be a product of the confidence and the matching degree, or may be a value that is obtained through another positive correlation calculation. For example, if a degree of matching between particular candidate question information and the target question information entered by the user is 0.9, and a confidence of answer information corresponding to the candidate question information is 0.8, it may be learned through product calculation that a fusion value of the matching degree and the confidence is 0.72. If the specified first preset threshold is 0.7, it indicates that the answer information can be determined as a correct answer.

105. Output the corresponding answer information.

Optionally, during outputting of the answer information, if confidences or fusion values of a plurality of pieces of answer information are greater than or equal to the first preset threshold, all the plurality of pieces of answer information may be output, or answer information with a highest confidence or a largest fusion value may be output.

106. Output "incapable of answering".

To avoid outputting an incorrect or inaccurate answer, when none of answer information in the knowledge base of the server has a high confidence or a large fusion value, it indicates that the server is incapable of answering the target question. The server determines that the target question is an unknown question, and the server outputs "incapable of answering" to the user. Although the server is incapable of answering the question entered by the user, no incorrect answer is output to mislead the user.

Optionally, when determining that the target question is an unknown question, the server may further obtain an answer to the target question from another knowledge base to provide a supplement or an update for the target question, or manually provide a supplement or an update.

The embodiment of FIG. 2 describes how to determine, based on the calculated confidence of the answer in the candidate question and answer pair when the server obtains the question entered by the user, whether there is an accurate answer, to perform outputting. Optionally, a discriminator model may be trained to calculate the confidence, and a generator model may be trained to generate the adversarial question in the adversarial database. Details are described as follows.

Based on the question probability model shown in FIG. 1, the question probability model is a probability model of machine learning. In a learning phase, the model is trained in an answer database that is based on a question and answer knowledge base. In a use (testing) phase, the model receives a question entered by a user, and calculates, based on the model obtained through training, a probability that the question is a known question or an unknown question.

Figure 3:
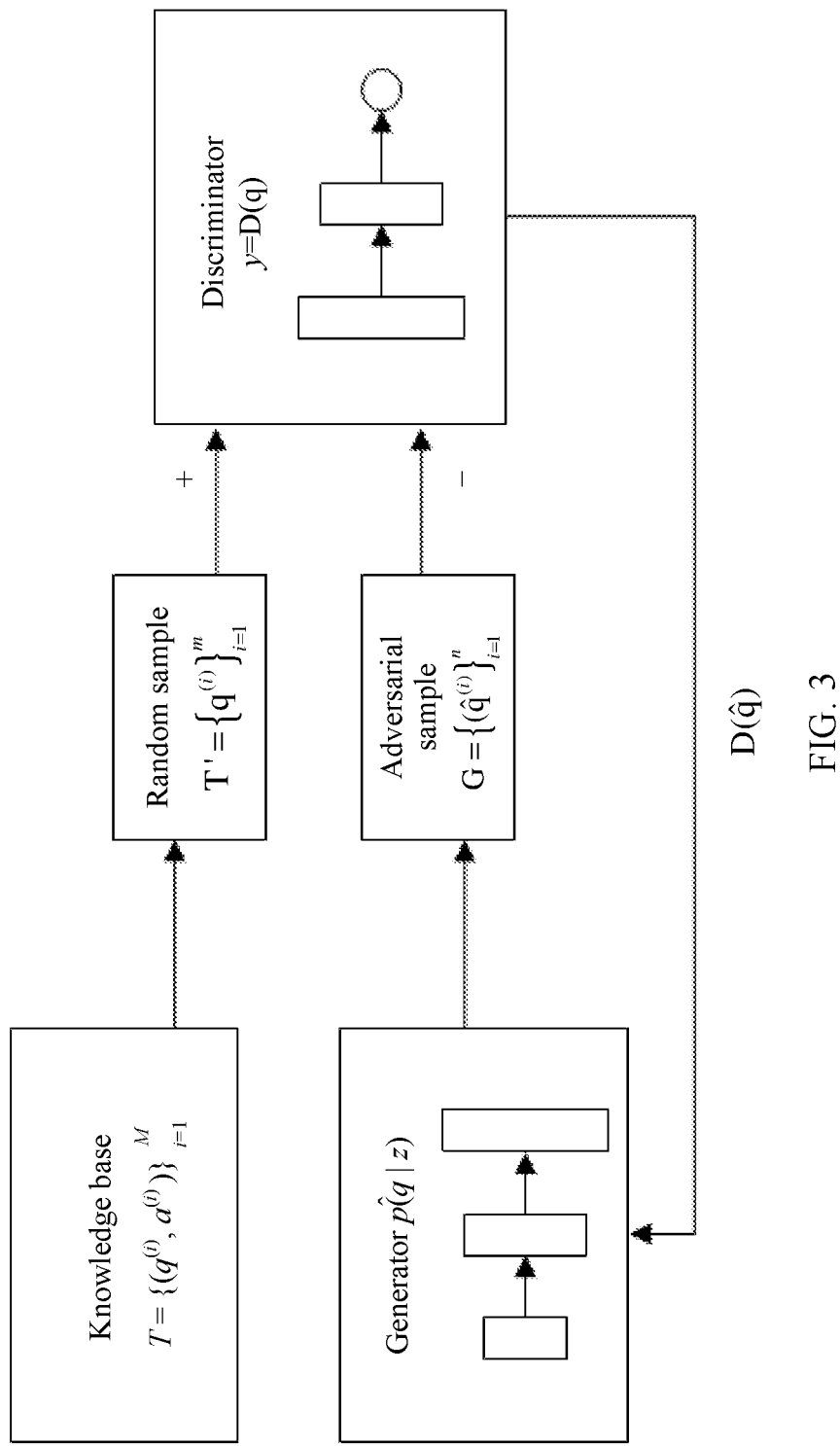
FIG. 3 is a schematic diagram of an embodiment of adversarial training according to an embodiment of the present disclosure.

In this embodiment of the present disclosure, the question probability model is trained using an adversarial training method. Further, as shown in FIG. 3, questions in the answer database of the knowledge base are used as training data, and training includes generator training and discriminator training. The generator $P(\hat{q}|z)$ is a probability generation model (z is a random vector) whose objective is to generate a sample (in an embodiment, a question in a natural language) that is consistent with distribution of the training data (in an embodiment, a set of questions in the knowledge base). The discriminator $D(q)$ is a classifier whose objective is to accurately determine whether a sample (in an embodiment, a question in a natural language) is from the training data or from the generator. In this way, the generator and the discriminator are "adversaries". The generator is continuously optimized such that the discriminator cannot recognize a difference between the generated sample and a training data sample. The discriminator is continuously optimized such that the discriminator can recognize the difference. The generator and the discriminator are alternately trained to finally achieve a balance. The generator can generate a sample that completely conforms to the distribution of the training data (so that the discriminator cannot distinguish between the sample and the training data), while the discriminator can sensitively recognize any sample that does not conform to the distribution of the training data.

FIG. 3 shows an embodiment training procedure. For each time of discriminator training, m questions (a set T') are randomly sampled from the knowledge base (a set T) as positive samples, and n questions (a set G) are generated by the generator as negative samples (or referred to as adversarial samples). The discriminator $D(q)$ is trained using T' and G as training sets such that the discriminator distinguishes between sources (the positive sample or the negative sample) of the samples in the training data as much as possible. For each time of generator training, the discriminator $D(q)$ is used as a rule for determining whether a sample generated by the generator conforms to the training data, and the generator $P(\hat{q}|z)$ is trained based on the rule such that the generator can generate, as much as possible, a sample that is determined by the discriminator as a positive sample. Iteration is performed in such a manner until the balance is achieved and neither the discriminator nor the generator changes. Finally, the discriminator is used to determine whether a question conforms to distribution of questions in the knowledge base, in other words, whether the question can be answered.

For a question of a user, the confidence calculation module shown in FIG. 1 performs comprehensive determining with reference to determining by the question probability model and with reference to a retrieval result (a candidate question and answer pair, a matching degree and a confidence of the question, and the like) of the question in a search engine, to determine whether the question of the user can be answered. If the question can be answered, a corresponding answer is provided. If the question cannot be answered, that the question cannot be answered is fed back to the user.

Further, joint distribution of a question q and a candidate answer $a^{(i)}$ is calculated as follows.

$$p(q,a^{(i)})=p(q)p(a^{(i)}|q)=D(q)g(q,a^{(i)})$$

The joint distribution reflects a prior probability p(q) of the question q, in an embodiment, whether the question is in the knowledge base, and a conditional probability $p(a^{(i)}|q)$ of the answer $a^{(i)}$ to the question, in an embodiment, whether the answer matches the question, whether the answer is reliable, and so on. A result D(q) of the discriminator in the question probability model is directly used as the prior probability, and the conditional probability is calculated as a function $g(q,a^{(i)})$ of features such as the matching degree and the confidence. Based on specific questions and known information, the function $g(q,a^{(i)})$ may have different forms, such as a linear function, a polynomial function, a neural network, and a decision tree/forest. Parameters in the function $g(q,a^{(i)})$ may also be determined through machine learning.

With reference to the embodiment of FIG. 2, optionally, before the target question information is obtained, a set of M questions in the answer database may be further input into the generator such that model training is performed on the generator, and N adversarial questions are generated based on a trained model. The N adversarial questions generated by the generator are obtained, and the N adversarial questions are saved in the adversarial database.

It is assumed that M question and answer pairs that are selected from the answer database of the knowledge base in a question answering system are $T=\{(q^{(i)},a^{(i)})\}_{i=1}^{M}$, where both the question $q^{(i)}$ and the answer $a^{(i)}$ are in a natural language. A set of questions $T=\{(q^{(i)})\}_{i=1}^{M}$ in the answer database is selected as training data for adversarial training.

Figure 4:
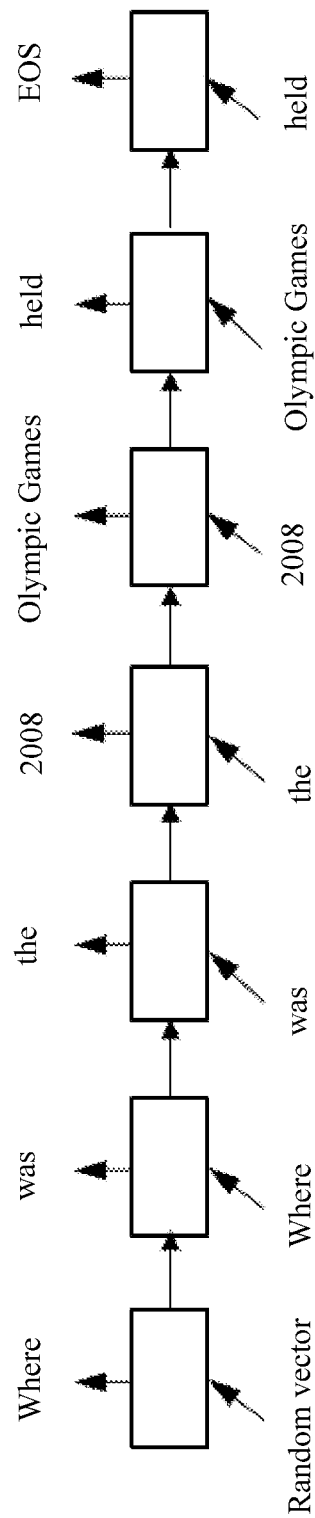
FIG. 4 is a schematic diagram of an embodiment of generating an adversarial question by a generator according to an embodiment of the present disclosure.

Optionally, in this embodiment, a recurrent neural network (RNN) is used as a generator for questions in a natural language. As shown in FIG. 4, EOS indicates an end symbol.

Further, the recurrent neural network receives a length-variable input sequence (for example, a sentence in a natural language, which may be considered as a sequence of words), and successively calculates each hidden state (hidden state) variable. An $i^{th}$ state variable is calculated using a current input word and a previous state variable: $h_i=f_h(x_i,h_{i-1})$, where $f_h$ is a multilayer neural network. A simple implementation is $f_h(x_i,h_{i-1})=\phi_h(Ux_i+Wh_{i-1})$, where $\phi_h$ is a sigmoid function such as $$\phi_h(x) = \frac{1}{1+\exp(-x)}.$$

In practice, $f_h$ is often modeled using an LSTM (Long Short-Term Memory) or GRU (Gated Recurrent Unit) that is more complex. In addition, after each state variable is determined, the recurrent neural network can continuously generate words and eventually form a sequence (in an embodiment, a sentence in a natural language). A generation probability of an $i^{th}$ word is: $p(y_i|y_1 \ldots, y_{i-1})=g_h(h_i, y_{i-1})=\phi_g(Ey_{i-1}+W_o h_i)$. A generation probability of the entire sentence is: $P_{RNN}(\hat{q}|z)=P(y_1, \ldots, Y_L|z)=P(y_1|z)\Sigma_{i=2}^{L}p(y_i|y_1, \ldots, y_{i-1})$. Therefore, when a random initial input vector is provided to the recurrent neural network, a sentence can be generated and obtained, and natural language distribution that can be generated is determined by parameters in the sentence.

Optionally, adversarial training is set to be performed on the discriminator model and the generator model in order to strengthen a capability of generating an adversarial question by the generator, and strengthen a capability of determining a question probability by the discriminator. Discriminator training may be further inputting a set of K questions in the answer database and a set of L questions in the adversarial database into the discriminator such that model training is performed on the discriminator using the set of K questions as positive samples and the set of L questions as negative samples; and inputting the adversarial question generated by the generator into the discriminator such that the discriminator determines a belonging probability of the adversarial question, where the belonging probability is used to indicate a probability that a question belongs to the answer database or the adversarial database. K and L are positive integers greater than or equal to 1, and specific values of K and L may be the same or may be different.

Figure 5:
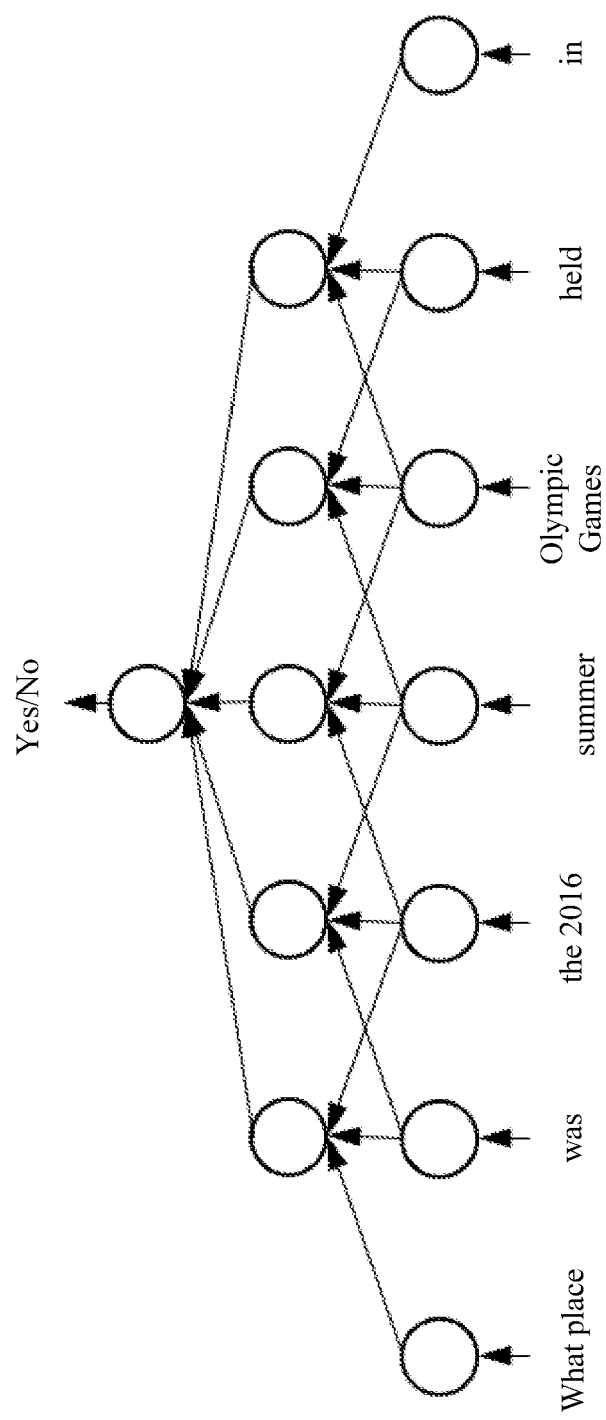
FIG. 5 is a schematic diagram of an embodiment of determining a belonging probability of a question by a discriminator according to an embodiment of the present disclosure.

In this embodiment, a convolution neural network (CNN) may be used as the discriminator for the questions in a natural language, as shown in FIG. 5.

Further, for an input sequence, a convolution and pooling calculation manner is used. A convolution calculation manner is: $z_i^j=\phi(W^j[x_i^T, x_{i+1}^T, \ldots, x_{i+k-1}^T]+h_j)$, where $z_i^j$ indicates a value of an $i^{th}$ feature at a $j^{th}$ position after convolution, and k indicates a length of a sliding window. A pooling calculation manner is to calculate a maximum value (max-pooling): $z^j=\max(Z_1^j, z_2^j, \ldots, Z_L^j)$ Such a convolution and pooling manner can be repeated many times. Finally, softmax is performed on $z=[z^1, z^2, \ldots, z^I]$ to obtain a discriminant function $D_{CNN}(q)$ $\phi(W^q z+b_q)$. Herein, $D_{CNN}(q)$ provides a probability of whether a question is from the answer database (in other words, whether the question can be answered).

In a process of training the generator model and the discriminator model, adversarial training may be performed on the generator model and the discriminator model to increase capabilities of the two models. Therefore, in this embodiment, the following steps may be further included.

The server obtains a determining result of the adversarial question from the discriminator, and inputs the determining result to the generator such that model training is performed on the generator based on the adversarial question determined by the discriminator and based on the determining result, and a new adversarial question is generated based on the trained model. The server obtains the new adversarial question generated by the generator, and saves the new adversarial question in the adversarial database. The server inputs a set of K random questions in the answer database and a set of L random questions in the adversarial database into the discriminator such that model training is performed on the discriminator using the set of K questions as positive samples and the set of L questions as negative samples, where the set of L questions includes the newly generated adversarial question.

The discriminator performs model training on the generator based on the positive samples and the negative samples, determines, using a trained discriminator model, a belonging probability of each adversarial question generated by the generator, and sends a determining result to the generator such that model training is performed on the generator based on the new adversarial question determined by the discriminator and the determining result. Adversarial training is performed recurrently in this way in order to improve the capability of generating an adversarial question by the generator, and improve a capability of determining a belonging probability of an adversarial question by the discriminator.

Referring to the foregoing example, further, a method for training the discriminator is as follows.

Step 1. Randomly sample m questions $\{q^{(i)}\}_{i=1}^{m}$ from the knowledge base as positive samples.

Step 2. Select 1 questions $\{\hat{q}^{(j)}\}_{i=1}^{l}$ from a generator $p_{RNN}$ ($\hat{q}|z$) as negative examples.

Step 3. For a discriminator $D_{CNN}$ ($q;\theta_D$) where $\theta_D$ is a parameter in the function, optimize a target function:

$$\max_{\theta_D} \sum_{i=1}^{m} \log D_{CNN}(q^{(i)}; \theta_D) + \sum_{j=1}^{n} \log(1 - D_{CNN}(\hat{q}^{(j)}; \theta_D)).$$

Further, $\theta_D$ is solved using a gradient descent algorithm:

$\theta_D \leftarrow \theta_D + \alpha \nabla_{\theta_D}(\Sigma_{i=1}^{m} \log D_{CNN}(q^{(i)};\theta_D) + \Sigma_{j=1}^{n} \log(1 - D_{CNN}(\hat{q}^{(j)};\theta_D)))$.

Further, a method for training the generator may be as follows:

Step 1. Generate n random vectors $\{z^{(j)}\}_{j=1}^{n}$, where $p(z)=N(0,\sigma^2 I)$ is normal distribution.

Step 2. Generate n questions $\{\hat{q}^{(j)}\}_{i=1}^{n}$ using a generator $P_{RNN}(\hat{q}|z;\theta_G)$.

Step 3. Obtain a determining result $\{D_{CNN}(\hat{q}^{(j)})\}_{i=1}^{n}$ of the n questions using a discriminator.

Step 4. Optimize a target function for the generator $p_{RNN}(\hat{q}|z;\theta_G)$.

$$\max_{\theta_G} \sum_{j=1}^{n} \log(D_{CNN}(\hat{q}^{(j)}))$$

Further, a reward function is defined as $r(\hat{q})=\log(D_{CNN}(\hat{q}))$, and the target function is:

$$\max_{\theta_G} R(\theta_G), \ R(\theta_G) = \sum_{j=1}^{n} p_{RNN}(\hat{q}^{(j)} | z^{(j)}; \theta_G) r(\hat{q}).$$

$\theta_G$ is solved using a gradient descent algorithm:

$\theta_G \leftarrow \theta_G \alpha \nabla_{\theta_G} R(\theta_G)$.

The following is obtained based on a REINFORCE algorithm:

$\nabla_{\theta_G} R(\theta_G) = \Sigma_{j=1}^{n} \nabla_{\theta_G} \log p_{RNN}(\hat{q}^{(j)}|z^{(j)};\theta_G) r(\hat{q}^{(j)})$.

For the recurrent neural network (RNN), $\nabla_{\theta_G} \log p_{RNN}(\hat{q}^{(j)}|z^{(j)};\theta_G)$ may be obtained through calculation.

Optionally, when a variation amount of the determining result that is obtained by the discriminator by determining the belonging probability of the question based on all the obtained positive samples and negative samples is less than a second preset threshold, inputting, into the discriminator, a set of questions selected from the answer database and a set of questions selected from the adversarial database is stopped, and inputting the determining result of the discriminator into the generator is stopped, to stop the generator from generating a new adversarial question.

In an embodiment, the discriminator and the generator are alternately trained in the adversarial training to finally achieve a balance. When the capability of the generator and the capability of the discriminator are trained to an extent, the discriminator determines that the belonging probability of the question generated by the generator tends to stabilize. For example, a fixed sample is used as an example. When a fixed positive sample and a fixed negative sample are used by the discriminator as a basis for discriminating a question, if it is determined in a preset quantity of times (such as twenty times) that a probability that an adversarial question generated by the generator belongs to the answer database is between 0.39 to 0.41, it indicates a determining capability of the discriminator tends to stabilize. In this case, training of the generator and discriminator models may be stopped.

Optionally, quantities of times that the generator and the discriminator are trained may be used as a determining condition to determine whether to stop training. For example, a training index is set to 1000 times. If the generator has been trained 1000 times, the training may be stopped. If the discriminator has been trained 1000 times, the training may be stopped.

Figure 6:
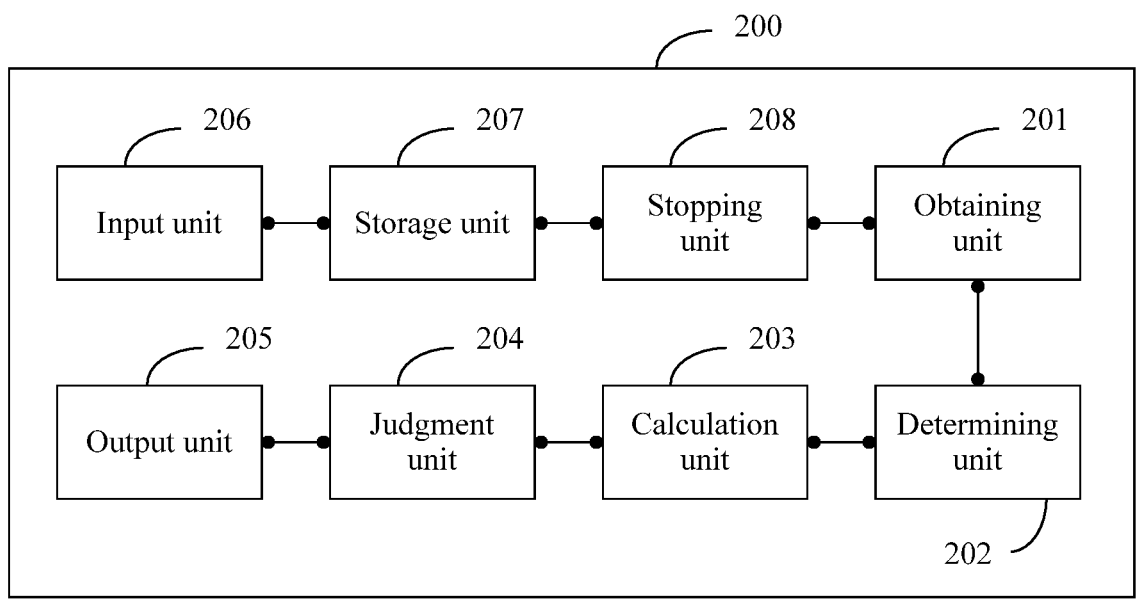
FIG. 6 is a schematic diagram of an embodiment of a question answering apparatus according to an embodiment of the present disclosure.

Referring to FIG. 6, an embodiment of a question answer apparatus 200 according to an embodiment of the present disclosure includes an obtaining unit 201 configured to obtain target question information; a determining unit 202 configured to determine a candidate question and answer pair based on the target question information; a calculation unit 203 configured to calculate a confidence of corresponding answer information in the candidate question and answer pair, where the confidence is used to indicate a probability that question information in the candidate question and answer pair belongs to an answer database or an adversarial database, where the confidence is positively correlated to the probability that the question information in the candidate question and answer pair belongs to the answer database, the answer database is a database that stores a standard question and answer pair, and the adversarial database is a database that stores trained adversarial question information corresponding to the standard question and answer pair; a judgment unit 204 configured to determine whether the confidence is less than a first preset threshold; and an output unit 205 configured to, when the confidence is greater than or equal to the first preset threshold, output the corresponding answer information, or when the confidence is less than the first preset threshold, output "incapable of answering".

Optionally, the judgment unit 204 is further configured to determine whether a fusion value of the confidence and a matching degree is less than the first preset threshold, where the matching degree is a degree of matching between the target question information and question information that is stored in the answer database, and the confidence and the matching degree are separately positively correlated to the fusion value.

Optionally, the answering apparatus 200 further includes an input unit 206 configured to, before the obtaining unit obtains the target question information, input a set of M questions in the answer database into a generator such that model training is performed on the generator, and N adversarial questions are generated based on a trained model, where the obtaining unit 201 is further configured to obtain the N adversarial questions generated by the generator; and a storage unit 207 configured to save the N adversarial questions in the adversarial database.

Optionally, the input unit 206 is further configured to, before the obtaining unit 201 obtains the target question information, input a set of K questions in the answer database and a set of L questions in the adversarial database into a discriminator such that model training is performed on the discriminator using the set of K questions as positive samples and the set of L questions as negative samples.

The input unit 206 is further configured to input the adversarial questions generated by the generator into the discriminator such that the discriminator determines belonging probabilities of the adversarial questions. The belonging probability is used to indicate a probability that a question belongs to the answer database or the adversarial database.

The obtaining unit 201 is further configured to obtain a determining result of the adversarial question from the discriminator.

The input unit 206 is further configured to input the determining result into the generator such that model training is performed on the generator based on the adversarial question determined by the discriminator and based on the determining result, and a new adversarial question is generated based on a trained model.

The obtaining unit 201 is further configured to obtain the new adversarial question generated by the generator.

The storage unit 207 is further configured to save the new adversarial question in the adversarial database.

Optionally, the input unit 206 is further configured to input a set of K random questions in the answer database and a set of L random questions in the adversarial database into the discriminator such that model training is performed on the discriminator using the set of K questions as positive samples and the set of L questions as negative samples. The set of L questions includes the newly generated adversarial question.

Optionally, the answering apparatus 200 further includes a stopping unit 208 configured to, when a variation amount of the determining result that is obtained by the discriminator by determining the belonging probabilities of the questions based on all the obtained positive samples and negative samples is less than a second preset threshold, stop inputting a set of questions selected from the answer database and a set of questions selected from the adversarial database into the discriminator, and stop inputting the determining result of the discriminator into the generator.

Figure 7:
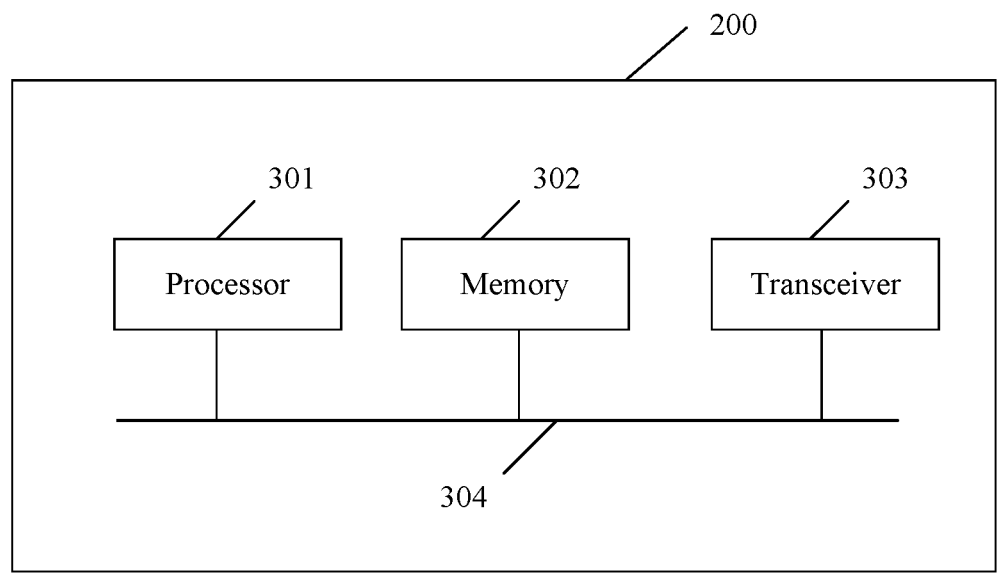
FIG. 7 is a schematic diagram of another embodiment of a question answering apparatus according to an embodiment of the present disclosure.

There is another form of embodiment for the answering apparatus 200 described in the embodiment of FIG. 6. Referring to FIG. 7, the answering apparatus 200 includes a processor 301, a memory 302, and a transceiver 303. The processor 301, the memory 302, and the transceiver 303 may be connected using a bus 304. The transceiver 303 may include a transmitter and a receiver. The memory 302 stores a computer instruction. The processor executes the computer instruction, to implement a function of the question answering method in the embodiment of FIG. 2. Various flexible design manners may be used in specific implementations. For a corresponding function of each component, further refer to the method embodiments. This is not limited in the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

All or some of the foregoing embodiments may be implemented using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, digital video disk (DVD)), a semiconductor medium (for example, a solid state disk (SSD)), or the like.

What is claimed is:

1. A question answering method, comprising:
obtaining target question information;
determining a candidate question and answer pair based on a matching degree between the target question information and question information stored in a database;
calculating, based on a first probability that question information in the candidate question and answer pair belongs to an answer database and a second probability that the question information in the candidate question and answer pair belongs to an adversarial database, a confidence of answer information in the candidate question and answer pair, wherein the confidence indicates a third probability that the question information in the candidate question and answer pair belongs to either the answer database or the adversarial database, wherein the confidence is positively correlated to the first probability that the question information in the candidate question and answer pair belongs to the answer database, wherein the answer database comprises a standard question and answer pair, and wherein the adversarial database comprises trained adversarial question information that corresponds to the standard question and answer pair;
determining whether a fusion value of the confidence and the matching degree between the target question information and the question information stored in the database is less than a first preset threshold; and
outputting information that indicates an incapability of answering the candidate question and answer pair when the fusion value of the confidence and the matching degree between the target question information and the question information stored in the database is less than the first preset threshold.

2. The question answering method of claim 1, wherein the confidence and the matching degree are each positively correlated to the fusion value.

3. The question answering method of claim 1, wherein before obtaining the target question information, the question answering method further comprises:
inputting, into a generator model, a set of M questions in the answer database to permit model training to be performed on the generator model;
obtaining, from the generator model, N adversarial questions based on a trained model; and
saving the N adversarial questions in the adversarial database.

4. The question answering method of claim 3, wherein before obtaining the target question information, the question answering method further comprises:
inputting, into a discriminator model, a set of K questions in the answer database and a set of L questions in the adversarial database to permit model training to be performed on the discriminator model using the set of K questions as positive samples and the set of L questions as negative samples;
inputting the N adversarial questions into the discriminator model to permit the discriminator model to determine belonging probabilities of the N adversarial questions, wherein each of the belonging probabilities indicates the first probability that a question belongs to the answer database or the second probability that the question belongs to the adversarial database;
obtaining, from the discriminator model, a determining result of the N adversarial questions;
inputting, into the generator model, the determining result of the N adversarial questions to permit model training to be performed on the generator model based on the N adversarial questions and based on the determining result of the N adversarial questions;
receiving, from the generator model, a new adversarial question based on a trained model; and
saving the new adversarial question in the adversarial database.

5. The question answering method of claim 4, wherein a higher confidence indicates a higher probability that a corresponding question belongs to the answer database.

6. The question answering method of claim 4, further comprising inputting, into the discriminator model, a set of K random questions in the answer database and a set of L random questions in the adversarial database to permit model training to be performed on the discriminator model using the set of K questions as positive samples and the set of L questions as negative samples, wherein the set of L questions comprises the new adversarial question.

7. The question answering method of claim 6, further comprising:
stopping inputting a set of questions selected from the answer database and a set of questions selected from the adversarial database into the discriminator model when a variation amount of the determining result of is less than a second preset threshold; and
stopping inputting the determining result of the discriminator model into the generator model.

8. A question answering apparatus, comprising:
a memory configured to store computer instructions; and
a processor coupled to the memory and configured to execute the computer instructions, wherein the computer instructions cause the processor to be configured to:
obtain target question information;
determine a candidate question and answer pair based on a matching degree between the target question information and question information stored in a database;
calculate, based on a first probability that question information in the candidate question and answer pair belongs to an answer database and a second probability that the question information in the candidate question and answer pair belongs to an adversarial database, a confidence of answer information in the candidate question and answer pair, wherein the confidence indicates a third probability that the question information in the candidate question and answer pair belongs to either the answer database or the adversarial database, wherein the confidence is positively correlated to the first probability that the question information in the candidate question and answer pair belongs to the answer database, wherein the answer database comprises a standard question and answer pair, and wherein the adversarial database comprises trained adversarial question information that corresponds to the standard question and answer pair;
determine whether a fusion value of the confidence and the matching degree between the target question information and the question information stored in the database is less than a first preset threshold; and
output information that indicates an incapability of answering the candidate question and answer pair when the fusion value of the confidence and the matching degree between the target question information and the question information stored in the database is less than the first preset threshold.

9. The question answering apparatus of claim 8, wherein the confidence and the matching degree are each positively correlated to the fusion value.

10. The question answering apparatus of claim 8, wherein before obtaining the target question information, the computer instructions further cause the processor to be configured to:
input a set of M questions in the answer database into a generator model to permit model training to be performed on the generator model;
obtain N adversarial questions based on a trained model from the generator model; and
save the N adversarial questions in the adversarial database.

11. The question answering apparatus of claim 10, wherein a higher confidence indicates a higher probability that a corresponding question belongs to the answer database.

12. The question answering apparatus of claim 10, wherein before obtaining the target question information, the computer instructions further cause the processor to be configured to:
input a set of K questions in the answer database and a set of L questions in the adversarial database into a discriminator model to permit model training to be performed on the discriminator model using the set of K questions as positive samples and the set of L questions as negative samples;
input the N adversarial questions into the discriminator model to permit the discriminator model to determine belonging probabilities of the N adversarial questions, wherein each of the belonging probabilities indicates the first probability that a question belongs to the answer database or the second probability that the question belongs to the adversarial database;
obtain a determining result of the N adversarial questions from the discriminator model;
input the determining result into the generator model to permit model training to be performed on the generator model based on the N adversarial questions and based on the determining result of the N adversarial questions;
receive, from the generator model, a new adversarial question based on a trained model; and
save the new adversarial question in the adversarial database.

13. The question answering apparatus of claim 12, wherein the computer instructions further cause the processor to be configured to input a set of K random questions in the answer database and a set of L random questions in the adversarial database into the discriminator model to permit model training to be performed on the discriminator model using the set of K questions as positive samples and the set of L questions as negative samples, and wherein the set of L questions comprises the new adversarial question.

14. The question answering apparatus of claim 13, wherein the computer instructions further cause the processor to be configured to:
stop input of a set of questions selected from the answer database and a set of questions selected from the adversarial database into the discriminator model when a variation amount of the determining result is less than a second preset threshold; and
stop input of the determining result of the discriminator model into the generator model.

15. A non-transitory computer readable storage medium for implementing a question answering method, wherein the non-transitory computer readable storage medium comprises computer instructions that, when executed by a processor, cause the processor to:
obtain target question information;
determine a candidate question and answer pair based on a matching degree between the target question information and question information stored in a database;
calculate, based on a first probability that question information in the candidate question and answer pair belongs to an answer database and a second probability that the question information in the candidate question and answer pair belongs to an adversarial database, a confidence of answer information in the candidate question and answer pair, wherein the confidence indicates a third probability that the question information in the candidate question and answer pair belongs to either the answer database or the adversarial database, wherein the confidence is positively correlated to the first probability that the question information in the candidate question and answer pair belongs to the answer database, wherein the answer database comprises a standard question and answer pair, and wherein the adversarial database comprises trained adversarial question information that corresponds to the standard question and answer pair;
determine whether a fusion value of the confidence and the matching degree between the target question information and the question information stored in the database is less than a first preset threshold; and
output information that indicates an incapability of answering the candidate question and answer pair when the fusion value of the confidence and the matching degree between the target question information and the question information stored in the database is less than the first preset threshold.

16. The non-transitory computer readable storage medium of claim 15, wherein the confidence and the matching degree are each positively correlated to the fusion value.

17. The non-transitory computer readable storage medium of claim 15, wherein before obtaining the target question information, the computer instructions further cause the processor to:
input, into a generator model, a set of M questions in the answer database to permit model training to be performed on the generator model;
obtain, from the generator model, N adversarial questions based on a trained model; and
save the N adversarial questions in the adversarial database.

18. The non-transitory computer readable storage medium of claim 17, wherein before obtaining the target question information, the computer instructions further cause the processor to:
input, into a discriminator model, a set of K questions in the answer database and a set of L questions in the adversarial database to permit model training on the discriminator model using the set of K questions as positive samples and the set of L questions as negative samples;
input the N adversarial questions into the discriminator model to permit the discriminator model to determine belonging probabilities of the N adversarial questions, wherein each of the belonging probabilities indicates the first probability that a question belongs to the answer database or the second probability that the question belongs to the adversarial database;

obtain, from the discriminator model, the belonging probabilities of the N adversarial questions;

obtain, from the discriminator model, a determining result of the N adversarial questions;

input, into the generator model, the determining result of the N adversarial questions to permit model training to be performed on the generator model based on the N adversarial questions and based on the determining result of the N adversarial questions;

receive, from the generator model, a new adversarial question based on a trained model; and save the new adversarial question in the adversarial database.

19. The non-transitory computer readable storage medium of claim 18, wherein the computer instructions further cause the processor to input, into the discriminator model, a set of K random questions in the answer database and a set of L random questions in the adversarial database to permit model training to be performed on the discriminator model using the set of K questions as positive samples and the set of L questions as negative samples, and wherein the set of L questions comprises the new adversarial question.

20. The non-transitory computer readable storage medium of claim 19, wherein the computer instructions further cause the processor to:

stop input of a set of questions that are selected from the answer database and a set of questions that are selected from the adversarial database into the discriminator model when a variation amount of the determining result is less than a second preset threshold; and stop input of the determining result of the discriminator model into the generator model.

* * * * *